Patented Sept. 10, 1940

2,213,954

UNITED STATES PATENT OFFICE 2,213,954

RETARDER OF VULCANIZATION

Richard A. Crawford, Akron, Ohio, assignor to The B. F. Goodrich Company, New York, N. Y., a corporation of New York No Drawing. Application October 2, 1937,
Serial No. 167,021

11 Claims. (Cl. 260—89)

This invention relates to the vulcanization of polymerized halogenated butadienes, and particularly to the vulcanization of the polymerized chlor-2-butadiene-1,3 known as neoprene.

It is well known that polymerized halogen-2-butadiene-1,3 may be vulcanized by heating in the presence of certain metallic oxides with or without sulfur. Very great care must be exercised, however, because the vulcanization takes place so readily at low temperatures that the compositions often "scorch" or prevulcanize while they are being milled, calendered, or extruded, thereby causing great loss of time and materials. This uncontrollability has resulted in a search for materials which will retard the vulcanization so that the compositions may be processed with little difficulty and still give good cures in reasonable times at curing temperatures.

I have discovered that the vulcanization of polymerized halogen-2-butadiene-1,3 at processing temperatures is retarded by a member of the class of certain unsaturated dibasic acids and their derivatives comprising maleic acid, maleic anhydride, phthalic acid, tetrahydro phthalic acid, tetrahydro phthalic anhydride, metallic maleates, and metallic phthalates. Compositions containing these compounds produce excellent cures at curing temperatures, in 45 minutes at 287° F. for instance. The preferred metallic maleates and phthalates include the alkali metal, alkaline earth metal, magnesium lead and zinc compounds, although other metal compounds may be used. Although these compounds often act as retarders for zinc oxide and other accelerators, they produce the best results when used in conjunction with lead compounds such as litharge and lead carbonate which act as accelerators for neoprene vulcanization. The lead maleates and phthalates may be used to replace litharge, as will hereafter be shown.

The retarders may be used in proportions varying from about 1 to 10 parts by weight to 100 parts of polymer. Three parts of maleic acid is usually sufficient, while greater percentages of the metallic compounds are necessary.

To illustrate the advantages obtainable by using the retarders of my invention, the following compositions were prepared:

| Composition | 1 | 2 | 3 | 4 | 5 | 6 |
|---|---|---|---|---|---|---|
| Neoprene | 100 | 100 | 100 | 100 | 100 | 100 |
| Magnesia | 10 | 10 | 10 | 10 | 10 | 10 |
| Phenyl-beta-naphthylamine | 2 | 2 | 2 | 2 | 2 | 2 |
| Carbon black | 100 | 100 | 100 | 100 | 100 | 100 |
| Rosin oil | 10 | 10 | 10 | 10 | 10 | 10 |
| Litharge | 10 | 10 | 10 | 10 | 10 | 10 |
| Maleic anhydride | | 3.0 | | | | |
| Maleic acid | | | 3.6 | | | |
| Phthalic acid | | | | 5.1 | | |
| Tetrahydro phthalic anhydride | | | | | 4.7 | |
| Tetrahydro phthalic acid | | | | | | 5.2 |

To determine the effectiveness of the retarder, samples of each composition were kept in an oven for 8 hours and 24 hours at 158° F. The percent loss in plasticity was calculated.

| Composition | Percent loss in plasticity | | | | | |
|---|---|---|---|---|---|---|
|  | 1 | 2 | 3 | 4 | 5 | 6 |
| 8 hrs. at 158° F | 50 | 2 | 3 | 29 | 3 | 5 |
| 24 hrs. at 158° F | 94 | 8 | 10 | 91 | 9 | 11 |

Samples of each composition were cured for 45 minutes at 287° F. and all developed tensile strengths of between 1100 and 1500 lbs./sq. in. It is evident that although compositions containing the retarders of this invention vulcanize very slowly at 158° F. at curing temperatures they develop tensile strengths comparable to those developed by compositions containing no retarder.

In another embodiment of my invention, metallic maleates and phthalates are used to replace the litharge in the compositions, thereby providing easily processed compositions which vulcanize as readily at curing temperatures as compositions containing litharge. Since the retarder replaces the litharge, I use greater percentages of the metallic salts than of the acids or anhydrides. The following compositions were prepared:

| Neoprene | 100 | 100 | 100 |
|---|---|---|---|
| Magnesia | 10 | 10 | 10 |
| Phenyl-beta-naphthylamine | 2 | 2 | 2 |
| Carbon black | 100 | 100 | 100 |
| Rosin oil | 10 | 10 | 10 |
| Litharge | 6.86 | | |
| Lead maleate | | 9.9 | |
| Lead phthalate | | | 11.4 |

Comparative cures and plasticities of the compositions were as follows:

| Curing agent | Litharge | Lead maleate | Lead phthalate |
|---|---|---|---|
| Tensile strength in lbs./sq. in. after curing for 45 minutes at 287° F | 1580 | 1590 | 1400 |
| Plasticity at 100° C. after remaining 24 hrs. at room temperature | 43.2 | 72.6 | 74.7 |
| Plasticity at 100° C. after remaining 8 hrs. at 158° F | 15.1 | 49.9 | 54.7 |

It is evident that while the tendency to vulcanize at processing temperatures was greatly reduced by using the lead compounds as retarders, the compositions developed good tensiles in a reasonable time at curing temperatures. Other metallic compounds such as sodium maleate, calcium maleate, zinc phthalate etc. may also be used.

Any of the retarders within the scope of this invention may be similarly employed in any neoprene compositions whether or not they contain pigments, fillers, softeners, or antioxidants. If the neoprene is in the form of a solution or dispersion, the retarder may be simply dissolved or suspended therein. The retarder may be incorporated into a solid composition by milling or by mastication in an internal mixer. Compositions containing retarders may be vulcanized by the ordinary methods, i. e. in a mold, in open steam, or in hot air.

Although I have herein disclosed specific embodiments of my invention, I do not intend to limit myself solely thereto, for it will be obvious that many modifications such as substitution of equivalent materials and variation of proportions used are within the scope of the invention as defined in the appended claims.

I claim:

1. The process which comprises heating a vulcanizable polymerized halogen-2-butadiene-1,3 composition in the presence of a member of the class consisting of maleic acid, maleic anhydride, phthalic acid, tetrahydro phthalic acid, tetrahydro phthalic anhydride, metallic maleates, and metallic phthalates.

2. The process which comprises heating a vulcanizable neoprene composition in the presence of a member of the class consisting of maleic acid, maleic anhydride, phthalic acid, tetrahydro phthalic acid, tetrahydro phthalic anhydride, metallic maleates, and metallic phthalates.

3. The process which comprises vulcanizing neoprene in the presence of litharge and a member of the class consisting of maleic acid, maleic anhydride, phthalic acid, tetrahydro phthalic acid, tetrahydro phthalic anhydride, metallic maleates, and metallic phthalates.

4. The process which comprises vulcanizing a polymerized halogen-2-butadiene-1,3 in the presence of litharge and maleic acid.

5. The process which comprises vulcanizing neoprene in the presence of litharge and maleic acid.

6. The process which comprises heating a vulcanizable polymerized halogen-2-butadiene-1,3 composition in the presence of maleic acid.

7. The process which comprises vulcanizing neoprene in the presence of litharge and tetrahydro phthalic acid.

8. The process which comprises heating a vulcanizable polymerized halogen-2-butadiene-1,3 composition in the presence of tetrahydro phthalic acid.

9. The process which comprises vulcanizing a polymerized halogen-2-butadiene-1,3 in the presence of a metallic phthalate.

10. The process which comprises vulcanizing neoprene in the presence of a metallic phthalate.

11. The process which comprises vulcanizing neoprene in the presence of lead phthalate.

RICHARD A. CRAWFORD.